(12) United States Patent
Metz et al.

(10) Patent No.: US 12,320,386 B2
(45) Date of Patent: Jun. 3, 2025

(54) PLAIN BEARING

(71) Applicant: AKTIEBOLAGET SKF, Gothenburg (SE)

(72) Inventors: Philipp Metz, Katzenbach (DE); Dominik Barthelmann, Knetzgau (DE); Stefan Keller, Schweinfurt (DE); Martin Stephan, Hassfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 150 days.

(21) Appl. No.: 18/304,477

(22) Filed: Apr. 21, 2023

(65) Prior Publication Data

US 2023/0349419 A1    Nov. 2, 2023

(30) Foreign Application Priority Data

May 2, 2022   (DE) .......................... 102022204310.3

(51) Int. Cl.
*F16C 23/04* (2006.01)
(52) U.S. Cl.
CPC .................. *F16C 23/046* (2013.01)
(58) Field of Classification Search
CPC .... F16C 23/043; F16C 23/045; F16C 23/046; F16C 33/046
See application file for complete search history.

(56) References Cited

U.S. PATENT DOCUMENTS 3,243,212 A * 3/1966 May ........................ F16C 33/14
285/190
4,858,962 A * 8/1989 Bolling ............... F16C 11/0614
285/190

FOREIGN PATENT DOCUMENTS

CN          101334065 A  * 12/2008

OTHER PUBLICATIONS

Translation of CN-101334065 obtained Nov. 13, 2024.*

* cited by examiner

*Primary Examiner* — James Pilkington
(74) *Attorney, Agent, or Firm* — J-TEK LAW PLLC; Scott T. Wakeman; Mark A. Ussai

(57) ABSTRACT

A plain bearing includes an outer sliding surface element and an inner sliding surface element enclosed by the outer sliding surface element. The outer sliding surface element is divided along a substantially planar surface that includes the main axis of the sliding bearing and is formed with at least one radially encircling groove on the outer surface. A rubber-elastic or elastomeric is inserted in the at least one groove such that the ring holds together or retains the divided outer sliding surface element.

19 Claims, 1 Drawing Sheet

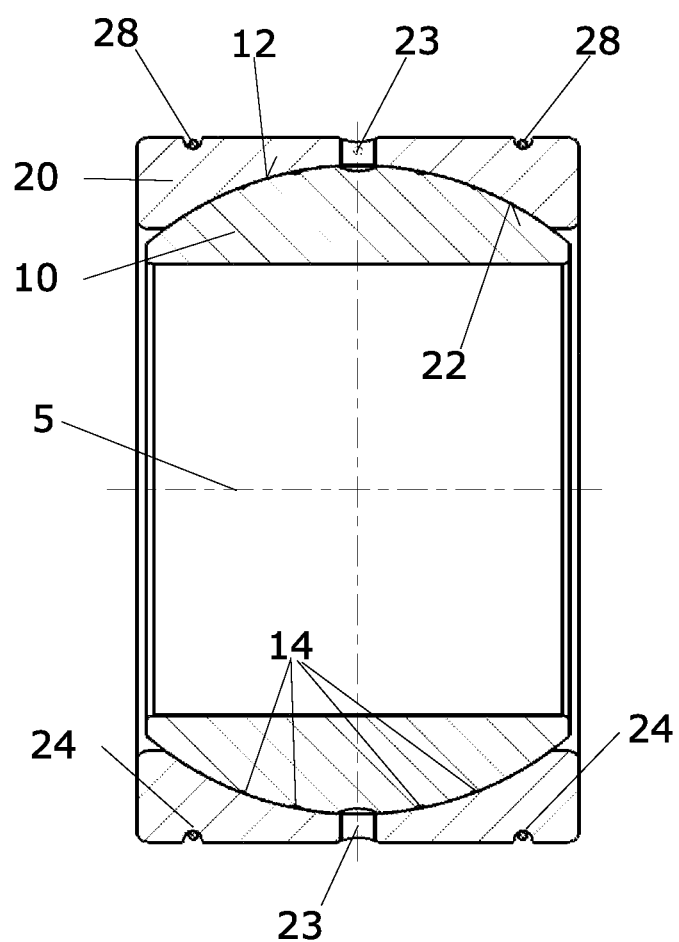

PLAIN BEARING

CROSS-REFERENCE

This application claims priority to German Patent Application No. 102022204310.3 filed on May 2, 2022, the entire contents of which are fully incorporated herein by reference.

BACKGROUND OF THE INVENTION

The present invention relates to bearings, and more particularly to plain bearings.

Plain bearings are generally known, and some plain bearings have an outer sliding surface element that is divided along an essentially flat surface that includes the main axis of the plain bearing, for example, produced by a breaking or a forced rupture. Thereby, the outer sliding surface element is divided into two semicircular portions that function as a single sliding surface element. Typically, at least one radially encircling groove is provided on the outer surface of the outer sliding surface element and a metal snap ring, which holds the divided outer sliding surface element together, is inserted in the groove.

SUMMARY OF THE INVENTION

An object of the present invention is to provide an improved plain bearing, which is achieved by a plain bearing comprising an outer sliding surface element divided along a substantially planar surface that includes the main axis of the plain bearing and is formed with at least one radially encircling groove on the outer surface. An inner sliding surface element is enclosed by the outer sliding surface element and a rubber-elastic ring is disposed within the at least one groove of the outer surface element and is configured to hold together the divided outer sliding surface element.

The present invention solves the problems of the previously known solution of one or more metal snap rings, which does not ensure secure cohesion or retention of the divided outer sliding surface element in some assembly options and the process of installing such metal snap rings on the plain bearing is significantly more difficult. According to the present invention, instead of the metal snap rings, rubber-elastic rings are now used, in particular commercially available rubber O-rings, wherein it has proven in a surprising manner that, although the rubber-elastic rings are much more cost-effective compared to the snap rings, a significantly improved cohesion/retention results and installation problems are safely prevented.

BRIEF DESCRIPTION OF THE SEVERAL VIEWS OF THE DRAWING

Further advantages, features, and details of the invention arise from the following exemplary embodiment of the invention described based on the FIGURE. In other embodiments, modifications of course arise of this one exemplary embodiment, among other things in the context of what is outlined in the patent claims. Further objects, features and advantages of the invention will become apparent from reading the following description, given solely by way of nonlimiting example and made with reference to the attached drawings in which:

FIG. 1 is a sectional view along a main axis of a plain bearing.

DETAILED DESCRIPTION OF THE INVENTION

A plain bearing includes a one-piece, annular, inner sliding surface element 10 having an outer sliding surface 12 that is configured or formed in accordance with the curved surface of a spherical disc; in other words, the element 10 is formed generally convex with an at least partially spherical surface. The inner sliding surface element 10 preferably includes lubrication grooves 14, which are formed for example, in a square-grid-type configuration. In other embodiments, the sliding surface 12 can be designed differently, in particular embodied with a lubrication groove system formed in any other appropriate manner. The inner sliding surface element 10 is preferably formed from rolling-element bearing steel, hardened with a hardness of at least 50 HRC and phosphated. In other embodiments, the sliding surface element 10 may be chromated or a steel-steel sliding surface pairing can instead be used. Furthermore, during delivery of the plain bearing, the sliding surface 12 can be treated with a running-in lubricant or merely protected by a corrosion inhibitor.

The inner sliding surface element 10 is enclosed by an outer sliding surface element 20. The outer sliding surface element 20 has an inner sliding surface 22 which is adapted to the inner sliding surface element 10 and is formed generally concave or as a portion of an inner surface of a sphere, i.e., the sliding surface 22 thus also corresponds to the curved surface of a spherical disc. The inner, concave sliding surface 22 of the outer sliding surface element 20 is formed to slidingly mate with or "match" the outer, convex sliding surface 12 of the inner sliding surface element 10; that is, the two sliding surfaces 12, 22 are matching so as to be slidable closely against each other. Further, the outer sliding surface element 20 is also preferably formed from a rolling-element bearing steel, hardened with a hardness of at least 50 HRC and phosphated. The sliding surface 22 is preferably also treated during delivery with a running-in lubricant. Furthermore, the outer sliding surface element 20 preferably includes two lubrication bores 23 radially penetrating the outer sliding surface element 20. The alternative embodiments described above for lubrication of the inner sliding surface element 10 accordingly also applies to the outer sliding surface element 20.

The outer sliding surface element 20 is formed divided, for example, by a breaking of or a cutting of an initially one-piece ring, or a forced rupture, along an essentially flat surface that includes a main axis 5 of the plain bearing (i.e., the axis of rotation of at least one of the sliding surface elements 10, 20). In other words, the outer sliding surface element 20 is divided along an axial plane including the main axis 5 so as to form two semi-circular portions or halves. The dividing of the outer sliding surface element 20 enables the assembly of the inner sliding surface element 10 within the outer sliding surface element 20, but creates the necessity of holding together or retaining the two halves of the outer sliding surface element 20 to function as a single annular body. For this purpose, at least one and preferably two radially encircling grooves 24 are incorporated on or adjacent to both of the two axial ends of the outer sliding surface element 20. With a groove outer diameter which corresponds to the outer diameter of the outer sliding surface element 20, for example with a value of about one hundred twenty-five millimeters (125 mm), each of the two grooves 24 is preferably configured with an approximately square cross-section of four millimeters by four millimeters (4 mm×4 mm) with generally rounded corners and/or edge regions.

Further, a rubber-elastic or elastomeric retainer ring 28, preferably a commercially available rubber O-ring 28, is inserted within each of the two grooves 24, the ring 28 preferably having a circular cross-section of approximately three and one-half millimeters (3.5 mm) in the example described above, and the diameter of the circular area formed by the unstretched rubber O-ring is preferably approximately one hundred two millimeters (102 mm). Being elastic or elastomeric, each ring 28 may be provided as an integral annular or circular body, deflected or stretched radially outwardly to fit about the two halves/semicircular portions of the outer sliding surface element 20, then released or otherwise allowed to contract toward an unstretched state after installation within one of the grooves 24. With proper sizing of the one or more rubber-elastic/elastomeric rings 28, each retainer ring 28 remains in a partially stretched state so as to exert a radially-inwardly directed retention force about the entire perimeter of the two halves of the outer sliding surface element 20 to thereby retain the two halves coupled together to function as a single surface element 20.

In other embodiments, the retainer rings 28 may be formed from or comprised of other materials and/or may have a cross-sectional area other than circular, for example, as an oval, elliptical, square-shaped, rectangular or complex shaped. In general, the diameter of the circular area formed by or enclosed by the O-ring in an unstretched state should be approximately 10% to 50% less than the diameter of each groove 24 in order to ensure a secure cohesion or retention of the two halves of the outer sliding surface element 20. Additionally, the diameter of the cross-sectional surface of the O-ring 28, or a dimension equivalent thereto in a non-circular cross-section, should correspond to approximately 1% to 5% of the outer diameter of the outer sliding surface element 20.

In other embodiments, the cross-sectional surface of the groove 24 may also be rectangular or U-shaped having two radial surface sections, and preferably has rounded edges and/or corner regions. The arranging of or locating of the groove 24 in the axial end region, as in the exemplary embodiment, is particularly appropriate or preferable since, within this region, the outer sliding surface element 20 has its greatest thickness and thus the structural integrity of the element 20 is weakened the least by the formation of the groove(s) 24 in this region. However, the groove 24 should be axially spaced from the axial end of the sliding surface element 20 by an axial distance of at least a value of the depth of the groove 24.

According to the exemplary embodiment, the depth of the groove is configured somewhat larger than the thickness of the O-ring, so that the inserted O-ring does not protrude past the groove 24, i.e., outwardly from the groove 24 and the outer surface of the outer sliding surface element 20. However, in other embodiments in, each groove 24 and the associated ring 28 may be relatively sized such that the ring 28 may protrude from the groove 24, and thus project radially from the outer surface of the outer sliding surface element 20, for example when in addition to the "holding-together" or retention function, a sealing function and/or special attaching with respect to the installation environment is desired to be achieved.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

REFERENCE NUMBER LIST

5 Main axis
10 Inner sliding surface element
12 Sliding surface
14 Lubrication groove
20 Outer sliding surface element
22 Sliding surface
23 Lubrication bore
24 Groove
28 Rubber O-ring

We claim:

1. A plain bearing comprising:
   an outer sliding surface element divided along a substantially planar surface that includes a main axis of the plain bearing and is formed with at least one radially encircling groove on the outer surface;
   an inner sliding surface element enclosed by the outer sliding surface element; and
   a rubber-elastic ring disposed within the at least one groove of the outer surface element and configured to hold together the divided outer sliding surface element;
   wherein the outer sliding surface element has two axial ends, the at least one groove has a depth, and the at least one groove is disposed in an axial end region of the outer sliding surface element so as to be spaced from one of the two axial ends of the outer sliding surface element by a distance of at least a value of the depth of the groove.

2. The plain bearing according to claim 1, wherein at least one of:
   the outer sliding surface element has a sliding surface, the inner sliding surface element has a sliding surface mating with the sliding surface of the outer sliding surface element, and the sliding surface of each one of the outer sliding surface element and the inner sliding surface element correspond approximately to the curved area of the surface of a spherical disc;

each one of the outer sliding surface element and the inner sliding surface element is configured annular; and the inner sliding surface element is formed one-piece.

3. The plain bearing according to claim 1, wherein the rubber-elastic ring has cross-sections formed circular, elliptical, square-shaped, or rectangular.

4. The plain bearing according to claim 1, wherein the rubber-elastic ring is formed of an elastomeric material.

5. The plain bearing according to claim 1, wherein a diameter of the circular area enclosed by the rubber-elastic ring in an unstretched state has a value of approximately 10% to 50% less than a value of a diameter of the at least one groove and/or a value of an outer diameter of the outer sliding surface element.

6. The plain bearing according to claim 1, wherein a diameter of an approximately circular cross-sectional area of the rubber-elastic ring, or an equivalent dimension of a non-circular cross-section of the ring, has a value of approximately 1% to 5% of a value of a diameter of the groove or of a value of an outer diameter of the outer sliding surface element.

7. The plain bearing according to claim 1, wherein a cross-sectional area of the groove is configured rectangular, or U-shaped.

8. The plain bearing according to claim 1, wherein the depth of the groove corresponds to a thickness of the rubber-elastic ring or is configured greater than the thickness of the ring.

9. The plain bearing according to claim 8, wherein the depth of the groove is 5% to 30% greater than the thickness of the ring or is at least 75% of the thickness of the ring.

10. The plain bearing according to claim 1, wherein the outer sliding surface element has two axial ends, the at least one groove includes two grooves each formed adjacent to a separate one of the two axial ends of the outer sliding surface element and the rubber-elastic ring includes two rings each inserted in separate grooves.

11. A plain bearing comprising:
an outer sliding surface element having an inner, concave sliding surface extending circumferentially about a central main axis of the plain bearing, an outer surface extending circumferentially about the main axis and at least one radially encircling groove extending inwardly from the outer surface, the outer sliding surface element being divided along an axial plane including the main axis so as to form two semicircular outer element portions;
an inner sliding surface element disposed within the outer sliding surface element and having an outer, convex sliding surface extending circumferentially about the main axis and slidably disposed against the sliding surface of the outer sliding surface element; and
an elastomeric ring disposed within the at least one groove of the outer surface element and configured to hold together the two semicircular outer element portions of the outer sliding surface element;
wherein the at least one groove has a depth with a value and is located within an axial end region of the outer sliding surface element so as to be spaced from an axial end of the outer sliding surface element by a distance, the spacing distance having a value of at least the value of the depth of the groove.

12. The plain bearing according to claim 11, wherein at least one of:
the sliding surface of the outer sliding surface element and the sliding surface of the inner sliding surface element each correspond approximately to the curved area of the surface of a spherical disc;
the outer sliding surface element and the inner sliding surface element are each configured annular; and
the inner sliding surface element is formed one-piece.

13. The plain bearing according to claim 11, wherein the at least one elastomeric ring has cross-sections within the axial plane, each cross-section being formed circular, elliptical, square-shaped, or rectangular.

14. The plain bearing according to claim 11, wherein a diameter of a circular area enclosed by the at least one elastomeric ring in an unstretched state is approximately ten percent (10%) to fifty percent (50%) less than a diameter of the at least one groove and/or an outer diameter of the outer sliding surface element.

15. The plain bearing according to claim 11, wherein the at least one elastomeric ring has a cross-sectional area with a diameter, or has an equivalent dimension of a non-circular cross-section, with a value of one percent (1%) to five percent (5%) of a value of the diameter of the groove or of a value of the outer diameter of the outer sliding surface element.

16. The plain bearing according to claim 11, wherein the at least one groove has a cross-sectional area formed rectangular or U-shaped.

17. The plain bearing according to claim 11, wherein the depth of the groove is one of:
about equal to a thickness of the elastomeric ring; and
greater than the thickness of the elastomeric ring such that the ring is spaced radially inwardly from the outer surface of the outer sliding surface element.

18. The plain bearing according to claim 11, wherein:
the outer sliding surface element has two axial ends and the at least one groove of the outer surface element includes two grooves, each one of the two grooves being located adjacent to a separate one of the two axial ends of the outer sliding surface element;
the elastomeric ring is disposed within one of the two grooves; and
the plain bearing further comprises another elastomeric ring disposed within the other one of the two grooves.

19. A plain bearing comprising:
an outer sliding surface element having two axial ends and being divided along a substantially planar surface that includes a main axis of the plain bearing and is formed with at least one radially encircling groove on the outer surface, the groove being spaced axially apart from one of the two axial ends and being partially defined by two radial surface sections;
an inner sliding surface element enclosed by the outer sliding surface element; and
a rubber-elastic ring disposed within the at least one groove of the outer surface element and configured to hold together the divided outer sliding surface element, the ring being deflectable to fit over the outer sliding surface element and then contractable so as to be installed within the groove.

* * * * *